July 26, 1932. B. F. NIEDERGESASS 1,869,163
METHOD OF PRODUCING CLEAR VITREOUS SILICA
Filed Aug. 24, 1927
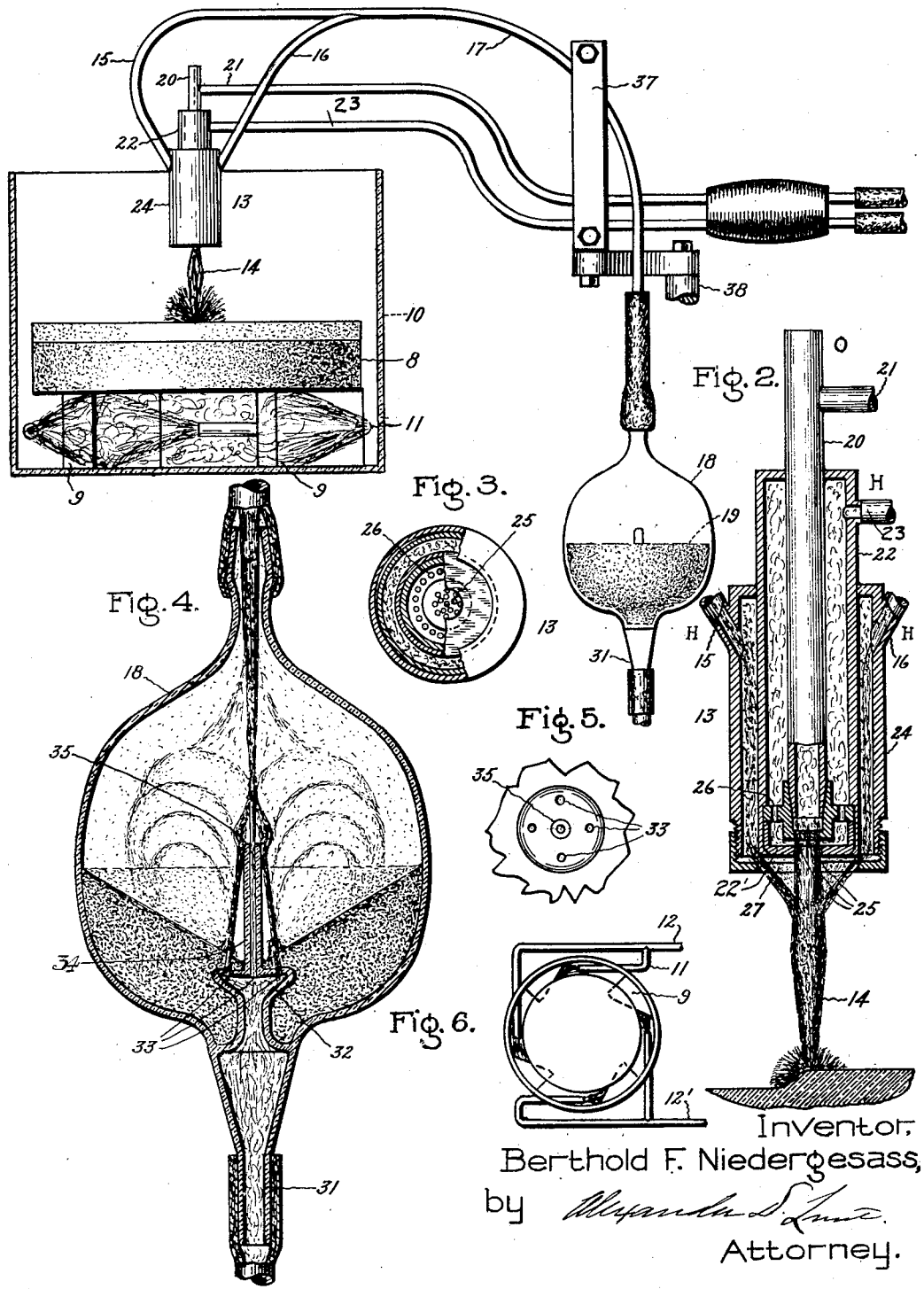
Inventor,
Berthold F. Niedergesass,
by
Attorney.

Patented July 26, 1932

1,869,163

UNITED STATES PATENT OFFICE

BERTHOLD F. NIEDERGESASS, OF LYNN, MASSACHUSETTS, ASSIGNOR TO GENERAL ELECTRIC COMPANY, A CORPORATION OF NEW YORK

METHOD OF PRODUCING CLEAR VITREOUS SILICA

Application filed August 24, 1927. Serial No. 215,216.

The present invention relates to the production of clear, vitreous silica in large masses and in particular to the production of articles of extensive area, or of irregular shape.

When clear, transparent crystalline quartz is subjected to fusion under ordinary conditions a more or less translucent, or partially opaque product containing many bubbles is obtained. In accordance with the process described in Devers Patent No. 1,536,821 issued May 5, 1925, a clear silica product may be obtained by fusing the crystalline silica in a vacuum and then subjecting the fused product to pressure. There are practical difficulties, however, in applying this process to the manufacture of articles of extensive surface, such for example, as astronomical mirrors. Some difficulties also are experienced in producing by this process silica articles with high grade optical properties.

In accordance with the present invention clear silica articles of extensive surface, or other desired form, are produced by the coalescence of fine particles of silica to form homogeneous masses, the support being heated as a whole to a highly elevated temperature in a substantially enclosed space. My invention also includes an article produced by the deposition of silica by this process.

An apparatus is illustrated by the accompanying drawing in which Fig. 1 is a somewhat diagrammatic side view of the apparatus; Fig. 2 is a vertical section of a gas burner forming part of the apparatus; Fig. 3 is an elevation of the burner for fusing the silica; Fig. 4 is a vertical section of a supply receptacle for holding raw material; Fig. 5 is a plan view of a nozzle for supplying silica located within the receptacle, and Fig. 6 is a plan view of the burners for preheating the base on which the clear silica is deposited.

Referring to the drawing, my invention will be explained in connection with the deposition of a layer of clear silica on a foundation of non-transparent or low grade silica as a step in the fabrication of an astronomical mirror. The foundation plate or base of opaque silica 8 is shown as resting upon supports 9. The base 8 is surrounded by a preheating oven 10 in which it is heated to about 800° C. by suitable burners 11 before the deposition of silica is begun. The maintenance of a highly heated environment for the support or foundation on which the silica powder is to be deposited and consolidated by fusion prevents cracking away of the deposited layer from the base when the coated article is cooled to ordinary temperature. As shown in Fig. 6, the supports 9 which may consist of fire brick also act as baffles to deflect the heating flames into the most intimate heating relation to the base 8. Four burners supplied with combustible gas by the pipes 12, 12' may be used. Small particles of silica are caused to impinge upon the base 8 by a gas burner 13, powdered silica being introduced into the flame 14, issuing from this burner, by the conduits 15 and 16 which branch from a conduit 17 leading to a silica supply reservoir 18. The charge 19 in the reservoir 18 preferably consists of finely divided particles of silica which have been preheated to about 800° C., chilled in water and then powdered. This finely divided silica is entrained remote from the gas burner 13 by a stream of gas, preferably by a combustible gas such as hydrogen, and thereby is delivered to the burner 13 as will be explained presently.

The burner 13 as best shown in Fig. 2 is provided with an inner conduit 20 to which a combustion-supporting gas, such as oxygen, is supplied by a tube 21, an outer conduit 22 to which a combustible gas, such as hydrogen, is supplied by a tube 23, the jets of hydrogen from the housing 22 being deflected by the end wall 22' at right angles into the oxygen jets from the conduit 20. Around the conduit 22 is a third conduit 24 to which hydrogen or other combustible gas is supplied by the tubes 15 and 16, also at an angle to the oxygen jets as indicated in Fig. 2. This gas serves to convey the finely divided silica.

As shown in Fig. 3, in an elevation partly broken away, the tip of the burner 13 is provided at the centre with a number of orifices 25 from which oxygen issues. Surrounding them is a ring of orifices 26 supplying hydrogen. The mixture of these gases burns with a high temperature flame. A circular opening 27 with walls slanting to direct gas issuing therefrom toward the flame, surrounds the hydrogen and oxygen openings and supplies the gas stream containing silica particles as shown in Fig. 2. The location of the hydrogen orifices with respect to the oxygen orifices assures intimate mingling of the combustible and combustion supporting gases in the flame and promotes uniformity of flame temperature. As the burner 13 is subjected to very high temperatures it should be made of suitable heat resistant metal, such as molybdenum, or of fused silica.

Although the finely divided silica may be introduced into the gas current carrying the same in any suitable way, I have shown in Fig. 4 an apparatus suited for supplying silica powder uninterruptedly with a carrier gas at low pressure. Hydrogen at a pressure of 8 to 10 pounds is supplied to the container 18 through an inlet conduit 31 terminating in a nozzle 32 which is provided with a number of holes 33, as shown in Fig. 5. Connected to the nozzle 32 is a second conduit 34 which extends upwardly and terminates in a nozzle 35.

As shown in Fig. 5 the central nozzle 85 is surrounded by spaced holes 33 which are inclined at an angle so that gas issuing therefrom is forced towards the center, that is, toward the tip of the nozzle 35. Hydrogen entering from the conduit 31 partly escapes through the holes 33 stirring up the silica powder and driving it toward the tip of the nozzle 35. Some of the hydrogen passes on through the nozzle 35 and issues from its tip carrying with it finely divided silica by an injector effect. The hydrogen laden with silica passes from the receptacle 18 through the conduit 17, and its branches 15 and 16 to the burner 13.

The flame from the burner 13 is allowed to play upon the foundation 8, a length of flame of about three inches being suitable. The flame raises the temperature of the spot on the preheated base 8 on which it plays to about 1750 to 1800° C. The silica particles are heated in the flame and hence stick to the highly heated silica on which the flame plays and then immediately are fused, and consolidated by accretion to form a homogeneous, substantially bubble-free mass. The burner 13 is swung back and forth over the surface of the foundation, the burner being pivotally supported by a bracket 37 upon a bearing 38.

By this procedure a clear cavity-free layer of vitreous silica may be deposited on the foundation. When the desired article is an astronomical mirror this clear layer may be later ground and polished to desired configuration while remaining on the foundation. When it is desired to produce other optical devices such as lenses or prisms, or in fact any form of high grade vitreous silica article, the deposition of clear silica may be continued until a thick layer of desired form has been produced which then may be mechanically subdivided by known methods and shaped into desired form. The word "opaque" has been used herein to designate an imperfectly transparent grade of silica as distinguished from a highly transparent product.

What I claim as new and desire to secure by Letters Patent of the United States is:—

1. The method of coating a massive article of silica with a homogeneous layer of transparent silica which consists in heating said article in an enclosed space to a temperature of about 800° C., depositing particles of silica upon said article through a flame, causing coalescence of said particles by fusion and progressively moving said flame over the surface of said article until a silica layer of desired thickness has been deposited.

2. The method of coating a massive article of silica with a homogeneous adherent film of clear silica which consists in heating said article to an elevated temperature, projecting fine particles of silica upon an area of said article, causing coalescence by fusion of said particles with the surface of said article and progressively continuing said deposition over adjoining areas of said article to form an adherent clear coating of silica.

3. An article of manufacture comprising a foundation consisting of non-transparent silica and a coating of clear silica, substantially bubble-free, formed by the accretion in a fused state of finely divided silica and being intimately united with said foundation throughout an extensive area of union.

4. The process of forming substantially homogeneous masses of refractory material from particles of said material which consists in introducing said particles into a flame produced by the combustion of combustible and combustion-supporting gases, one of said gases being delivered as a plurality of separate streams and the other gas being intimately intermingled with said streams, causing said flame to impinge upon a refractory support, separately heating said support to an elevated temperature, and traversing said flame over the surface of said support at a rate at which said particles will be fused and consolidated by said flame upon said support.

5. The process of forming substantially homogeneous masses of refractory material by the accretion and fusion of particles of said material which consists in introducing said particles into a flame constituted of a plurality of intermingled streams of combustible and combustion-supporting gases, causing said flame to impinge upon a refractory support of greater area than the cross-section of said flame, regulating the ratio and velocity of said gases to cause said particles to be deposited and fused by said flame upon said support, and traversing said flame over said support to enlarge the accretion area.

6. The process of forming substantially homogeneous masses of vitreous material by the accretion and fusion of particles of said material which consists in heating a refractory support as a whole to an elevated temperature, introducing particles of a desired vitreous material into a flame constituted of a plurality of intermingled streams of combustible and combustion-supporting gases, causing said flame to impinge upon said heated support, regulating the ratio and velocity of said gases to cause said particles to be fused by said flame upon impingement thereof on said support, and traversing said flame over the surface of said support to cause deposition and fusion of said material upon the area traversed.

7. The process of forming substantially homogeneous masses of refractory material which consists in producing a flame constituted of a compact bundle of intermingled jets of combustible and combustion-supporting gases, introducing particles of the chosen refractory material into said flame at a continuous rate at which the fusing effect of said flame is efficiently utilized, and traversing said flame over a foundation upon which material is deposited by said flame.

8. The process of depositing silica upon a refractory support of extensive surface which consists in separately heating said support as a whole in a substantially enclosed space to a highly elevated temperature, uninterruptedly projecting fine particles of silica upon said support through a flame formed by combustible and combustion-supporting gases, and regulating the ratio and velocity of said gases to cause said particles to be deposited and fused by said flame upon said support.

In witness whereof, I have hereunto set my hand this fifteenth day of August, 1927.

BERTHOLD F. NIEDERGESASS.